June 16, 1964  G. GIACOMELLO  3,137,058
CAPACITOR AGING
Original Filed Jan. 23, 1958

INVENTOR
Giacomo Giacomello
BY Connolly and Hutz
ATTORNEYS

3,137,058
CAPACITOR AGING
Giacomo Giacomello, Milan, Italy, assignor to Sprague Electric Company, North Adams, Mass., a corporation of Massachusetts
Original application Jan. 23, 1958, Ser. No. 710,746. Divided and this application Apr. 5, 1961, Ser. No. 100,995
1 Claim. (Cl. 29—25.31)

This invention relates to the aging of electrolytic capacitors, more particularly to the type of aging that improves the operating characteristics of these capacitors.

In the past it has been the practice for manufacturers of electrolytic capacitors to subject a capacitor, before or after encasing in the container or envelope in which it is to be used, to the action of an operating voltage for a period of time in order to lower the leakage current and bring its operating characteristics up to a higher level of efficiency. It appears that no matter how carefully the capacitor is assembled from its component parts, an anode dielectric film that is preformed before assembly suffers significant degradation or damage, probably by reason of the handling it undergoes during assembly. Because better operation of the capacitor can be obtained when the dielectric film is made by electrolytic formation in an electrolyte which is different from that incorporated in the final capacitor when it is placed in service, it is preferred to first form the dielectric coating in the desired forming electrolyte, then assemble the formed anode in the capacitor, then introduce the service electrolyte by impregnation, and then go through the aging procedure even though it makes the manufacture more complicated.

Among the objects of the present invention is the provision of a novel aging process which simplifies the above manufacture. It is another object of this invention to impregnate electrolytic capacitors during aging in a manner which effectively removes gas pockets from within the capacitor and simultaneously provides an effective aging of the capacitor.

Figure 1:
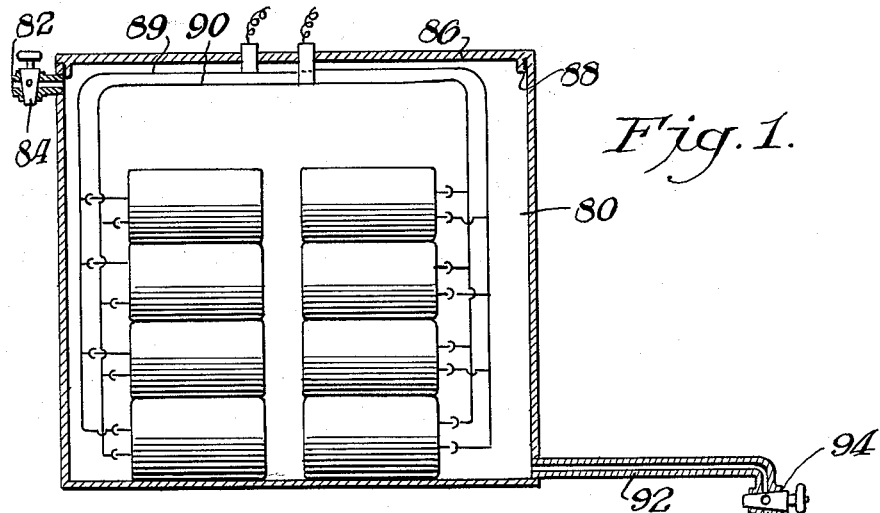
Figure 2:
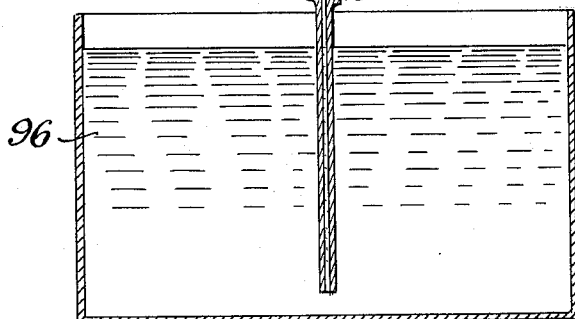
Figure 2:
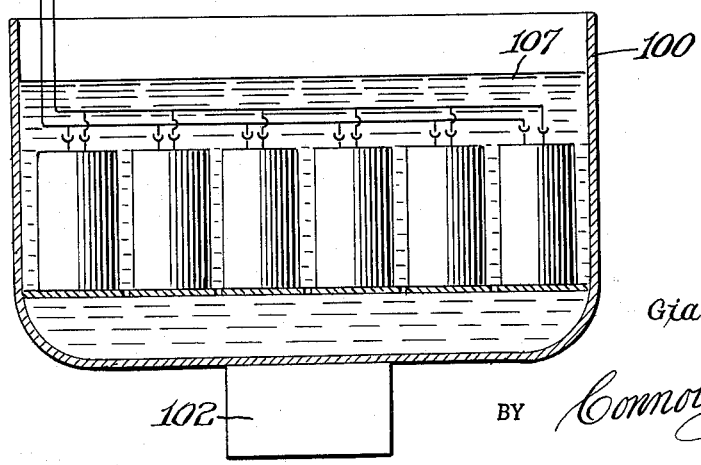

The above as well as additional objects of the present invention will be more clearly understood from the following description of several of its exemplifications, reference being made to the accompanying drawing wherein:

FIG. 1 is vertical sectional view of aging apparatus exemplifying the present invention; and FIG. 2 is a modified form of aging apparatus representative of the present invention.

According to the present invention, the aging of electrolytic capacitor sections is carried out during the impregnation with an aging potential applied to the electrodes of the section. The aging potential is applied with a very high current density as the potential is applied along the foil with the progressing electrolyte. Also the effect of producing gas on the anode and cathode during the aging is minimized by this invention. Bubbles form as a result of the gas production and ordinarily tend to prevent further aging. This invention provides for and facilitates their removal.

One highly effective techique for carrying out the process of the present invention is to wind a set of capacitor electrode foils with porous spacer ribbons to make an electrolytic capacitor section, connecting terminal leads to at least the anode electrode foil, applying to the foils an electric potential that renders the anode foil positive with respect to at least one other foil, at least one other electrode which need not be a foil and may be the container, and impregnating the wound section with an electrolytic capacitor electrolyte while the potental is applied so as to age the section during the impregnation.

FIGURE 1 shows an arrangement by which pneumatic forces are so utilized. In this modification an evacuating chamber 80 is provided with an exit line 82 connected to a source of suction. A valve 84 in this line controls the application of the suction to the interior of the chamber. A lid 86 suitably sealed against air leakage as by gasket 88, provides access to the interior of the chamber for insertion and removal of the capacitor sections to be impregnated. Electric supply leads 89, 90 are arranged to pass through the lid on one side of which they are connected to the capacitor sections and on the other side of which to the source of electric power. Chamber 80 is provided wtih an impregnating line 92 valved as at 94 and extending to near the bottom of an electrolyte supply container 96.

The apparatus of FIGURE 1 is used by loading the capacitor sections suitably connected to the leads 89, 90 into the chamber 80, placing a suitable amount of service electrolyte in container 96, closing valve 94, and opening valve 84 to apply suction so as to evacuate the chamber. After reducing the pressure in this chamber to about 10 millimeters of mercury or less, valve 94 is opened and the supply of electric power to leads 89, 90 commences. The suction in the chamber draws the electrolyte up into it, and the capacitor sections in this way become immersed. Because of the preliminary evacuation, the electrolyte more readily penetrates into all voids in the sections.

The section is positioned with its axis in a horizontal radial orientation for the reception of the electrolyte. As indicated above, the electrolyte as it progresses into the section is proceeding laterally of the chamber. In its impregnation of the section the electrolyte carried a high current density along the foil. This provides a higher current density for the few seconds that the advancing electrolyte passes along each area of the foil while wetting the foil than would be possible with the normal application of the aging potential to the foil area of the anode. At the same time it is a feature of this combined impregnation and aging that the current drops off rapidly along the electrode and consequently a large power supply is not necessary in attaining the effects of this invention. It is also to be noted that the elimination of bubbles is assisted. These bubbles result from the gas produced at the electrodes and tend to reduce the aging effect of the aging potential.

The pressure in the chamber 80 above the drawn-in electrolyte can be increased at atmospheric or above either immediately upon immersion, or after a delay of 5 to 10 minutes. Only about 15 minutes of immersion will give properly impregnated and aged capacitors whether or not the pressure above the electrolyte is raised at atmospheric. When the electrolyte is relatively viscous, such as at lower temperatures, it may be desirable to repeat the impregnation, as by draining the electrolyte, again applying suction, and after the pressure is reduced, again permitting the electrolyte to be sucked up so as to immerse the sections.

FIGURE 2 shows a further embodiment of the aging invention with a different assistance means in which the impregnation is accelerated by means of the forces developed through compressional vibration. An impregnation receptacle 102 is here illustrated as having its floor provided with a supersonic vibrator 102. A group of capacitor sections with their terminal leads connected together and to a source of electric power by means of connectors 104, 105, are placed in the receptacle, and a quantity of service electrolyte 107 introduced to cover the sections. The vibrator is then operated at a frequency of 20 to 50 thousand cycles per second under which conditions an electrolyte having a viscosity of 30 centistokes, and a density of 1.1 grams per cubic centimeter, will thoroughly impregnate and age capacitor sections with the application of as little as 10 watts of vibrational energy per quart of impregnant. In this method the removal of gas in the form of bubbles is largely assisted by the vibrational treatment of the capacitor sections during the impregnation.

The aging as described above is useful with capacitor sections having aluminum anodes covered with in situ formed oxide film provided as in the above mentioned Scherr et al. application or by the use of anodic oxidation of aluminum foil that is etched with unvarying direct current, or even the oxidation of unetched foil. Suitable oxidizing electrolyte for this formation are disclosed in U.S. Patent No. 2,444,725 issued July 6, 1948.

Tantalum can also be used in place of aluminum as the anode material and can be provided in the form of foils also oxidize anodically as in the manner indicated in the U.S. Patent No. 2,739,110. Columbium is another suitable anode material.

The capacitors aged in accordance with the present invention can have 1, 2, 3, 4 or more anodes separately assembled with one or more cathodes, and the cathodes can be in the form of foils or can be for the purpose of aging in any other form such as the walls of a container which forms the casing for the capacitors or of the impregnating vessel. Where separate anodes are used they can all be aged simultaneously by supplying all with current having the proper potentials with respect to one or more of the cathodes. It is also possible that in constructions having more than one cathode, only one need be connected in the aging circuit with all the anodes in order to reduce the number of terminal connection operations.

The aging potential should be less than the forming potential and higher than the designed operating potential. The forming potential is usually from 10 to 25 percent greater in value than the operating potential but may be as much as 50 percent higher than the operating potential. Where the aging current is applied at a potential of about 25 percent higher than the design operating potential, the aging is not fully effective, even though the aging is prolonged in duration. Such low voltage aging can be used, however, where minimum leakage current is not important, and for such purposes the low voltage aging can also be terminated at the end of the impregnation. Aging at a voltage more than 50 percent greater than the design operating voltage is generally to be avoided inasmuch as it changes the characteristics of the initially formed coating. Furthermore, extremely high voltages can also cause localized breakdown of the dielectric coating.

The impregnation temperature is generally as high as convenient. It is preferred to use temperatures of at least about 100° C., inasmuch as the viscosity of the impregnant is thereby reduced sharply, and more perfect impregnation takes place very rapidly. However, any impregnation temperature can be used even down to 0° C. if desired, particularly with capacitor sections that have more-porous spacers such as woven glass fiber sheets. The mere setting of a capacitor section in a body of cold impregnant without the help of any supplemental forces will effect impregnation, but impregnation in this way is likely to be incomplete unless continued for at least three or four hours. The aging will also be incomplete unless carried out for at least about 15 minutes during the completion of the impregnation. The effect of applying a very high current density as the electrolyte progresses along the foil is achieved with either type of impregnation. It is achieved more rapidly with the impregnation at reduced viscosities at a pressure differential. It thus appears that the impregnation assistance means while having common attributes are desirable in character. Similarly, the removal of inhibiting gas bubbles is more effectively achieved with the pressure differential and at reduced electrolyte viscosities.

The internal construction of the capacitor sections to be impregnated in accordance with the present invention can be varied in any desired manner. For example, the spacers can project from both sides of a convolutely wound assembly, and can also be extra long so that a few turns of spacer are wrapped around the section.

The electrical connections supplying the aging current are also subject to wide variation.

This invention relates to aging electrolytic capacitors before introduction into service in combination with impregnation of the capacitors in such a manner as to assist the aging. The unique and unexpected characteristics and combination of characteristics have been described and illustrated herein in both general and specific terms. In the description it is intended to provide a better understanding of the invention and its aspects without limiting the invention and without suggesting an equivalency between various combined features.

This application is a division of my co-pending application Serial No. 710,746 filed January 23, 1958, now abandoned.

What is claimed is:

The process of making an electrolytic capacitor which comprises the steps of convolutely winding a set of capacitor electrode foils having at least one formed anode foil with porous spacer ribbons to create a capacitor section, connecting a terminal lead to at least said anode foil, positioning said capacitor section in a container with a liquid electrolyte compound therein, applying to at least said anode foil of said capacitor section an electrical potential with a high current density that renders the foil positive with respect to a cathode, vibrating said capacitor section by a supersonic vibration, accelerating the compound in circulation in contact with said section by vibration, said vibration assisting the movement of said compound and removing the bubbles by the movement of said compound and forcing said compound into said sections and making close contact of the compound with said anode foil and applying the potential to the foil through the compound, whereby the potential is applied progressively along the foil as the compound is progressively forced into said section.

References Cited in the file of this patent

UNITED STATES PATENTS

| | | |
|---|---|---|
| 2,351,321 | Compton | June 13, 1944 |
| 2,393,966 | Brennan | Feb. 5, 1946 |